Patented Jan. 5, 1926.

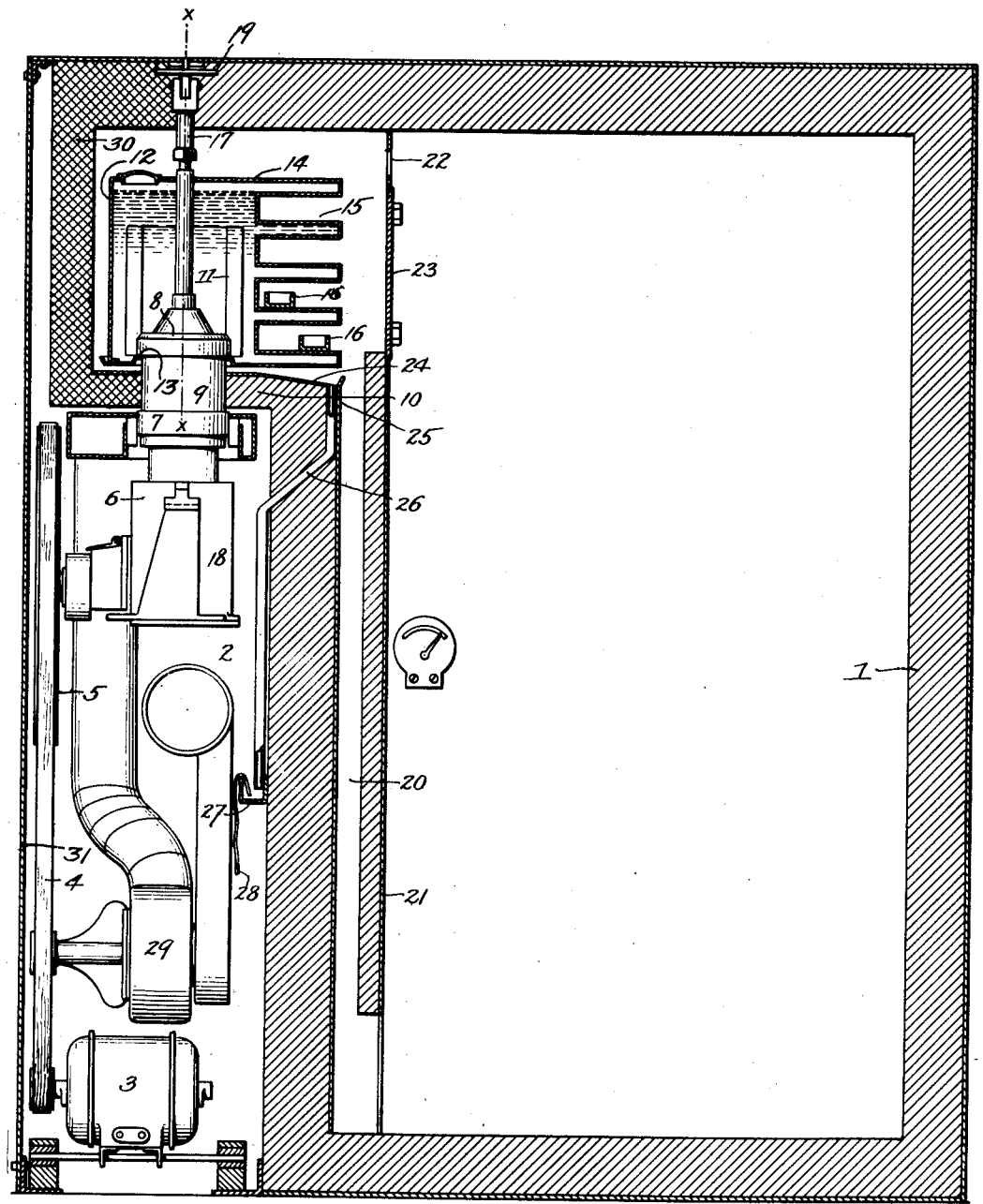

1,568,230

UNITED STATES PATENT OFFICE.

IVAR LUNDGAARD, OF HARTFORD, CONNECTICUT, ASSIGNOR TO THE AUTOMATIC REFRIGERATING COMPANY, OF HARTFORD, CONNECTICUT, A CORPORATION OF NEW JERSEY.

REFRIGERATING MACHINE.

Application filed February 5, 1924. Serial No. 690,781.

*To all whom it may concern:*

Be it known that I, IVAR LUNDGAARD, a citizen of the United States, and a resident of Hartford, county of Hartford, State of Connecticut, have invented certain new and useful Improvements in Refrigerating Machines, of which the following is a specification.

This invention relates to mechanical domestic refrigerators and has for its object a novel disposition of parts with reference to the refrigerating machinery and the cold storage compartment, whereby provision is made in a simple and effective manner for producing ice in addition to furnishing refrigeration to the food storage compartment.

The invention comprises the combination with the expansion cylinder of the refrigerating machine, of a brine tank mounted directly thereon, with heat absorbing vanes located in the brine tank attached to the cylinder, whereby the brine is cooled directly by contact not only with the heat absorbing vanes, but also with the cylinder itself. Shelf-like extensions of the brine tank form suitable supports for ice making cups.

Another feature of the present invention relates to means for getting access to the brine tank and for the removal of the machine from the refrigerator.

Other details of my present invention will appear from a description of the drawing, which represents a vertical section of a domestic refrigerator.

In the drawing, 1 is a refrigerator box having walls of heat-insulating material. Outside of these walls in a separate compartment 2, is located the mechanism for driving the refrigerating machine consisting of a motor 3, belt 4 and pulley 5, which pulley is mounted on the shaft of the refrigerating machine proper 6. This refrigerating machine is designed to use a gaseous mediating fluid such as air, which is alternately compressed in a hot cylinder 7 located in the machinery compartment and expanded in a cold cylinder 8 located in the cold compartment. A zone 9 between the hot cylinder and cold cylinder is made of heat insulating material and corresponds in position to the transverse insulating wall 10 of the refrigerator so that the hot elements below the zone are kept insulated from the cold elements above the zone. Mounted on the cold cylinder 8 are heat absorbing vanes 11 of copper, which are surrounded by a brine tank 12 secured to the cold cylinder at 13 by a water-tight joint. The tank has a cover 14 and shelf extensions 15, upon which water receptacles 16 may be placed for the purpose of making ice. It will be understood that the brine tank, when filled with brine, will absorb heat from such water receptacles and cause the water therein to freeze and also absorb heat from the air surrounding it and pass all the heat so absorbed into the cold cylinder walls either directly or through the medium of the heat absorbing vanes 11. A heat insulating compression post 17 is used to hold the cylinder together and to the crank case 18 by means of angle irons 19 and tension bolts not shown. The cold air around the brine tank is caused to descend through a passage 20 between a partition 21 and the inside of the box and thereby enter the cold storage compartment near the bottom, from which point it will pass up over the food to be chilled and through apertures 22 return to that part of the cold compartment around the brine tank. A door 23 in this partition keeps the air so circulating and yet permits accessibility to the shelves 15.

By the construction just described, it will be seen that it is possible to maintain a greater degree of refrigeration in and around the brine tank and consequently at the water freezing receptacles 16, than it is in the food compartment. In other words, it is possible to freeze water and make ice in one part of the refrigerator without having a degree of cold sufficient to freeze the food in the other part of the refrigerator. Any moisture dripping from the brine tank will fall on the inclined floor 24 and be caught in gutter 25 and led through conduit 26 to pan 27. Here a wick 28 will dissipate the moisture so collected into the hot air delivered by the fan 29, which is provided, for forcing the air over the hot cylinder, to abstract the heat therefrom.

In order to render the apparatus accessible for inspection, repairs or removal, I make part of the regrigerator box removable as shown at 30, the division line being made at the axial plane of the refrigerating machine from X to X. The outer sheet metal casing 31 is also made removable so that the removable section 30 of the insulating wall may be detached, thus rendering the whole of the apparatus free to be either inspected, repaired or removed.

I claim:—

1. A mechanical refrigerator, comprising a machine compartment and a cold compartment with a heat insulating partition between them, a refrigerating machine using a gaseous mediating fluid and having a hot cylinder in the machine compartment and a cold cylinder in the cold compartment, the cold cylinder having heat absorbing surface, and a tank mounted on the cold cylinder so that the tank as well as the fluid contained therein will contact with said heat absorbing surface.

2. A mechanical refrigerator, comprising a machine compartment and a cold compartment with a heat insulating partition between them, a refrigerating machine using a gaseous mediating fluid and having a hot cylinder in the machine compartment and a cold cylinder in the cold compartment, the cold cylinder having heat absorbing vanes attached thereto, and a brine tank mounted on the cold cylinder and surrounding the said vanes and the top of the cylinder, the said brine tank having shelf extensions.

3. A mechanical refrigerator, comprising a machine compartment and a cold compartment with a heat insulating partition between them, a refrigerating machine using a gaseous mediating fluid and having a hot cylinder in the machine compartment and a cold cylinder in the cold compartment, the cold cylinder having heat absorbing vanes attached thereto, and a brine tank mounted on the cold cylinder and surrounding the said vanes and the top of the cylinder, the said brine tank having shelf extensions with passages for brine therearound.

4. A mechanical refrigerator, comprising a machine compartment and a cold compartment with a heat insulating partition between them, a refrigerating machine using a gaseous mediating fluid and having a hot cylinder in the machine compartment and a cold cylinder in the cold compartment, the cold cylinder having heat absorbing vanes attached thereto, a brine tank mounted on the cold cylinder and surrounding the said vanes and the top of the cylinder, the said brine tank having shelf extensions with passages for brine therearound, and a partition between the part of the refrigerator containing the brine tank and the food compartment, and a door in said partition opposite the shelves in the brine tank.

5. A domestic mechanical refrigerator comprising a machine compartment, a cold compartment, a refrigerating machine having a hot cylinder in the machine compartment and a cold cylinder in the cold compartment, a heat insulating connection uniting the hot cylinder and cold cylinder closely surrounded by the heat insulating partition between the two compartments and a removable section of the insulating wall split along the center line of the cylinder.

6. A domestic mechanical refrigerator comprising a machine compartment, a cold compartment, a refrigerating machine having a hot cylinder in the machine compartment and a cold cylinder in the cold compartment, a heat insulating connection uniting the hot cylinder and cold cylinder closely surrounded by the heat insulating partition between the two compartments, and a removable section of the wall of the refrigerator parting on the axial line of the cylinder.

IVAR LUNDGAARD.